United States Patent [19]
Sullivan et al.

[11] Patent Number: 5,729,602
[45] Date of Patent: Mar. 17, 1998

[54] PROGRAMMABLE MULTI-TONE VOICE MESSAGE STARTING SYSTEM

[75] Inventors: Thomas Sullivan, Milford, N.H.; Herman Schnell, Davie, Fla.

[73] Assignee: Comex Systems, Inc., Miami, Fla.

[21] Appl. No.: 420,088

[22] Filed: Apr. 11, 1995

[51] Int. Cl.[6] ................................. H04M 1/00
[52] U.S. Cl. ............... 379/282; 379/67; 379/89; 379/283; 379/351
[58] Field of Search .................. 379/282, 283, 379/257, 97, 351, 67, 77, 80, 235, 253, 264, 361, 386; 831/15

[56] References Cited

U.S. PATENT DOCUMENTS

| | | | |
|---|---|---|---|
| 4,410,762 | 10/1983 | Ecklund | 381/15 |
| 4,484,035 | 11/1984 | Graham et al. | 379/351 |
| 4,623,761 | 11/1986 | Winter et al. | 379/84 |
| 4,667,065 | 5/1987 | Bangerter | 379/351 |
| 4,669,114 | 5/1987 | Reesor et al. | 379/257 |
| 4,771,449 | 9/1988 | Kiko et al. | 379/442 |
| 5,459,781 | 10/1995 | Kaplan et al. | 379/351 |
| 5,483,579 | 1/1996 | Stogel | 379/88 |
| 5,519,774 | 5/1996 | Battista et al. | 379/351 |

Primary Examiner—Krista M. Zele
Assistant Examiner—Jacques M. Saint-Surin
Attorney, Agent, or Firm—Wolf, Greenfield & Sacks, P.C.

[57] ABSTRACT

A system for detecting the presence, in an audio channel which may contain voice signals, of a tone at a frequency selectable from among a plurality of selectable frequencies. A bandpass filter receives the audio input; its center frequency is selectable in response to a control signal. A first detector circuit provides from the output of the bandpass filter an output signal when a tone containing substantial energy at about said center frequency is input to the filter. A band-stop filter having the same center frequency as the bandpass filter also receives the input audio; a second detector circuit demodulates and thresholds the band-stop filter output. A micro-controller provides the control signal to set the center frequencies of said filters in response to user selection and analyzes the detector circuit output signals and generates an output signal when the output signal from the first detector circuit indicates the presence of a tone for a predetermined time and the output signal from the second detector circuit indicates the lack of presence of substantial energy at frequencies other than the center frequency for the same predetermined time. Optionally, the invention is applied to substitute for the operator a more pleasing signal than a tone at said filter center frequency.

2 Claims, 4 Drawing Sheets

5,729,602

PROGRAMMABLE MULTI-TONE VOICE MESSAGE STARTING SYSTEM

FIELD OF THE INVENTION

This invention relates generally to the fields of tone detection and voice message delivery systems, such as automatic answering systems. More particularly, the invention relates to a programmable tone detection system which is particularly well-suited to detect selected tones within the audio-frequency range, received via a telephone line, to initiate operation of a device to play back one or more recorded messages.

BACKGROUND OF THE INVENTION

For a number of years it has been recognized that the cost of handling incoming telephone calls to businesses and directory assistance centers or similar sites can be reduced, operator fatigue can be reduced and operator performance can be improved by using automatic answering systems which relieve operators of the need to repeat greetings and other oft-used phrases. For example, the systems of U.S. Pat. Nos. 4,623,761 and 4,697,202, allow a telephone operator to record his or her greeting (and/or other message(s)) and to play back the recorded message or one of a number of messages by merely throwing or pressing a switch. In some versions of the Speak Easy answering device from Eltrex International Inc. of Amherst, N.H., it is not even necessary for the operator to operate a switch. Rather, the device is provided a trigger signal when the ring of an incoming call is detected and in response to the trigger signal, the device begins to play back a recorded message. The trigger signal is generated in the central office or PBX equipment, when a call comes in. A tone may be generated in the operator's headset (by the answering system, for example) to alert the operator that a call must be answered or that a caller will be on-line imminently; the operator's headset may be connected to the telephone line as the play back message ends, relieving the operator of having to listen to the recorded message. The operator may come on line live at the end of the recorded message.

There exist in use today a variety of telephone private branch exchange (PBX) systems, central office switching systems and automatic call directors (ACD's), many of which generate or can be adapted to generate a unique tone selection to signal a specific operational state or selection. For example, a tone (sometimes called a "zip" tone) may be generated and emitted to alert an operator that an incoming call is being processed or held or requires or will require service. This tone may precede the delivery of the call to the operator by a short interval and may draw the operator's attention, to prompt the operator into action, reducing the operator's idle time and speeding up call processing. A zip tone can be used as the trigger signal for an automatic answering unit, if the tone detection is reliable and fast. A need exists, therefore, for a system that can detect such tones and which will not falsely treat ordinary speech signal components as zip tones (otherwise, message playback will be triggered during normal conversations).

A common approach to tone detection involves use of a phase-locked loop (PLL) tone detection circuit such as the National Semiconductor LM567. However, PLL tone detectors exhibit unsatisfactory response when the input is a complex, time-varying signal such as a voice signal which may be present along with (or instead of) a tone. Moreover, the design trade-offs which are basic to a PLL are incompatible with the design goals for a zip-tone detector.

Additional problems are presented by the lack of standardization of the frequencies used for zip-tone signalling. Each ACD manufacturer, for example, is free to choose its own frequency and may use different frequencies in different products. Therefore, a need exists for a system which can be programmed to detect reliably a (zip) tone at a frequency of choice, in the presence of speech, with rapid response characteristics, and low cost, allowing use of the system with a variety of telephone switching systems.

SUMMARY OF THE INVENTION

According to the invention, such a system includes a bandpass filter whose center frequency is selectable in response to a control signal, and a band-stop filter having the same center frequency as the bandpass filter. The control signal is generated by a micro-controller in response to a user-input center frequency selection. Both filters receive as input the signals present in an audio channel from an ACD or similar source. The bandpass filter provides an output signal indicative of the presence of a tone at approximately the center frequency of the filter's passband. The band-stop filter provides an output signal indicative of the presence of a speech signal, which could falsely cause the output of the bandpass filter to suggest detection of a tone when the latter is in actuality detecting broad-spectrum voice.

A pair of identical detector circuits is provided, one receiving as input the output of the bandpass filter and the other receiving as input the output of the band-stop filter. The outputs of the detectors are monitored by the micro-controller. When the micro-controller sees the output of the bandpass filter indicating detection of a tone and the output of the band-stop filter not indicating detection of voice for a predetermined time, the micro-controller interprets that circumstance as indicating the detection of a tone at the preselected frequency, and outputs a corresponding signal. Optionally, the microprocessor then ignores the input for several seconds, to prevent false retriggering.

The foregoing and other features, advantages and object of the present invention will become more apparent and be more readily understood from the following detailed description, which should be read in conjunction with the accompanying drawing.

DETAILED DESCRIPTION

Figure 1:
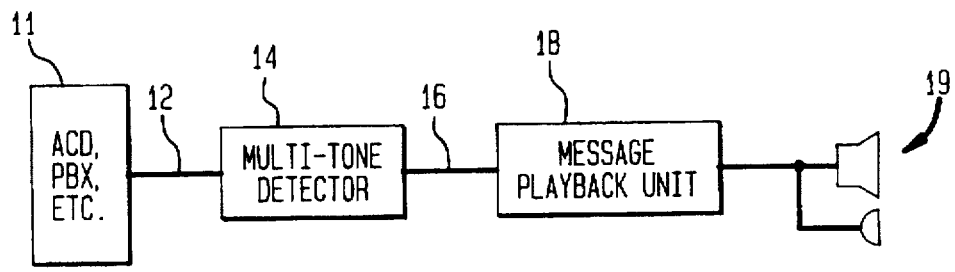
FIG. 1 is a block diagram of a system in which the invention may be useful.

Turning now to FIG. 1, there is shown a block diagram of a system in which the present invention may be used. A PBX or central office ACD or the like 11 supplies an audio signal on a telephone line 12 to a multi-tone detector 14 according to the invention. In turn, the multi-tone detector supplies a "play" signal (TONEDET) on line 16 to a message playback unit 18 when a tone of a predetermined frequency is received in the audio channel. This causes a prerecorded message to be played back over the telephone line (and, if desired, to an operator headset 19).

The detection of the predetermined tone is complicated by the fact that the tone is in the audio passband of the telephone channel which also supplies voice signals to the operator. Consequently, the task of the multi-tone detector is not only to determine whether there is substantial energy present at the tone frequency, but also to distinguish the energy of such tone from the energy of a voice signal which also may be present at or about the same frequency. Moreover, since it is desired that the system be usable with a variety of ACD's using differing zip-tone selections, the system also must be programmable to reset only to a selected frequency.

Figure 2:
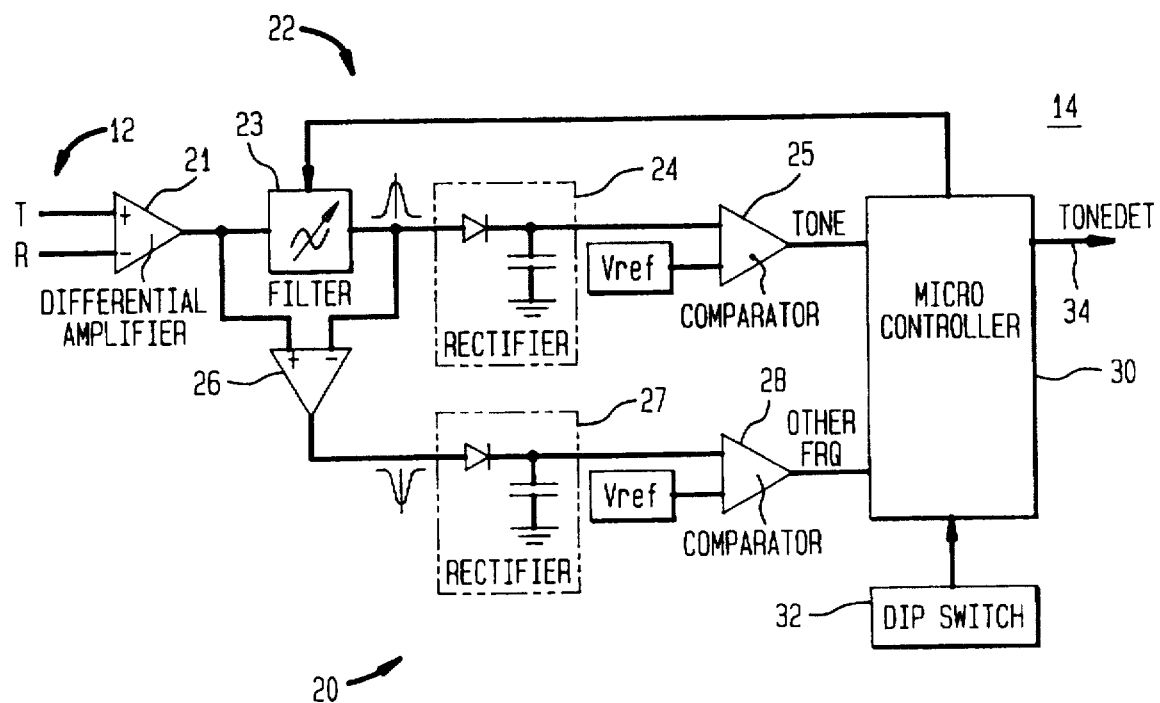
FIG. 2 is a block diagram of a programmable tone detector according to the invention.

A block diagram of an exemplary detector 14 is illustrated in FIG. 2. The exemplary detector principally comprises an analog signal processor 20 and a micro-controller 30. The analog signal processor, in turn, comprises a first differential amplifier 21 and a programmable dual-amplifier bandpass/band-stop filter-detector 22. The audio signal enters the circuit through the differential amplifier 21, which isolates the rest of the unit from the voltages on telephone lines T (tip) and R (ring). The programmable bandpass/band-stop filter-detector 22 includes a programmable audio bandpass filter 23; a first detector, comprising a first rectifier 24 and a first comparator 25; a second differential amplifier 26 which together with filter 23 forms a band-stop filter; and a second detector, comprising a second rectifier 27 and a second comparator 28. The micro-controller 30 has two functions. First, it responds to a tone selection code supplied via a suitable input mechanism (e.g. (DIP) switches) 32 and, in turn, outputs to filter 22 a control signal to set the center frequency of the filter. Second, it processes the outputs of comparators 25 and 28 to determine when a tone of the selected frequency has been detected.

In an exemplary embodiment, the center frequency of the filter 23 can be set by a pair of matched resistors. As illustrated, these resistors may be provided, for example, by a DS1267 dual digital potentiometer from Dallas Semiconductor. The setting of this dual potentiometer is controlled by microprocessor 30, which is programmed to choose (for each potentiometer) a resistance value corresponding to the desired filter center frequency. A calibration mechanism is provided to compensate for component tolerance and match the resistors presented to the filter. This filter has good Q (i.e., selectivity factor) and low sensitivity to component variations.

The output of bandpass filter 23 is fed to one input of second differential amplifier 26 and the buffered input signal from the output of the first differential amplifier 21 is fed to the other input of differential amplifier 26. Thus, the output of differential amplifier 26 is a signal corresponding to the difference between the buffered input signal and the bandpass filter output. This arrangement forms a complementary band-stop filter with the exact same center frequency as that of the bandpass filter 23 and tracking automatically changes in the center frequency of the bandpass amplifier. Thus at the same time, a tone at the selected center frequency may be detected along with a signal having energy at all in-band frequencies except around the center frequency.

The outputs of the two filters are filtered sine waves representing the energy passed to the output of each filter. To compare those outputs with fixed threshold energies (corresponding to fixed threshold voltages), first and second detectors are used to rectify the outputs of the respective filters. In the illustrated exemplary embodiment, the rectifiers are able to work with very low input voltages, in contrast with common full-wave rectifiers. The dc-filtered outputs of the rectifiers are compared to fixed threshold voltages, represented by the signals Vref, in comparators 25 and 28. The output of comparator 25 goes high when substantially energy passes through filter 23 at or near its center frequency. This may be due to the presence of a voice or music signal on the telephone line, or it may be due to the presence of a tone at that frequency. The output of comparator 28 goes high when there is sufficient energy on the buffered input at frequencies other than at and around the filter center frequency, as when there is a voice or music on the telephone line, or a tone or tones at a frequency(ies) other than the passband filter center frequency. Thus, the criteria for determining that a tone was detected at the preselected frequency are that the output of comparator 25 is high while the output of comparator 28 concurrently is low for a predetermined time.

Preferably, the comparators exhibit a small amount of hysteresis, to reduce the likelihood of false tone detection. Also, note that while the two comparators are shown as having the same threshold voltages, they may also have different threshold voltages.

The outputs of the comparators (the signals TONE and OTHER FREQ) are monitored by the micro-controller 30, which checks the condition of those signals at a rate determined by its clock and programming. A program executing in the micro-controller causes the micro-controller to signal on line 34 the detection of a tone at the selected frequency (i.e., generates a level or pulse signal called TONEDET) when the output of comparator 25 has remained high and the output of comparator 28 has remained low during the same interval for a predetermined time, such as 50 ms. The signal on line 32 may then be used to trigger an automatic greeting device (not shown) to play a prerecorded message.

To avoid false triggering while an automatic greeting or answering device is playing such a recorded message, responsive to tone detection, the micro-controller may disable the generation of a TONEDET signal for a short interval (e.g., 5 seconds) after the initial generation of a TONEDET signal.

Figure 3A:
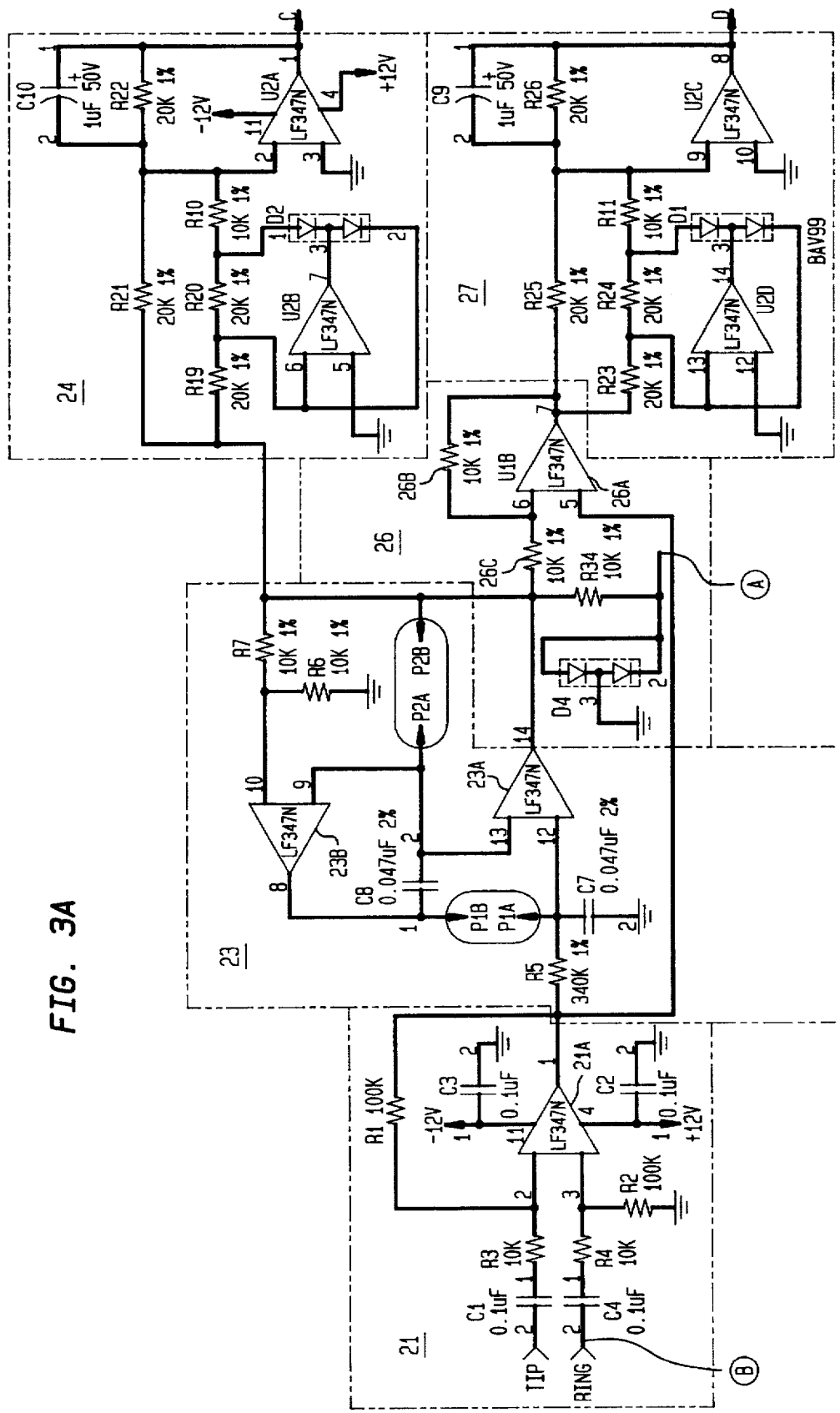
FIG. 3 is a detailed schematic circuit diagram of an illustrative embodiment of a tone detector in accordance with the block diagram of FIG. 2.
Figure 3B:
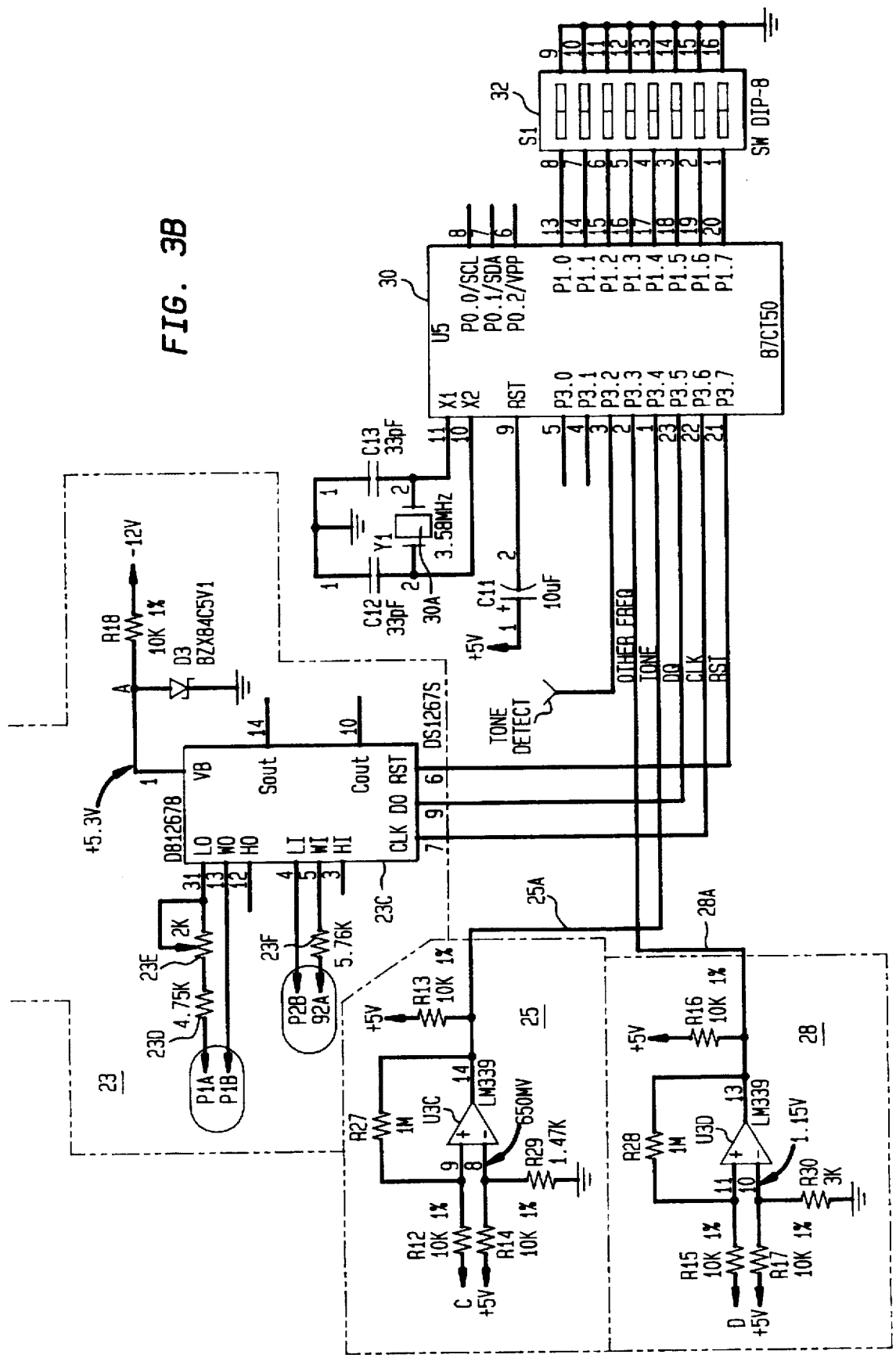

Turning now to FIG. 3, there is shown a schematic circuit diagram for an exemplary embodiment of the invention. The differential amplifier input stage 21 comprises a conventional ac-coupled amplifier based on an operational amplifier 21A, such as a type LF347 operational amplifier, and conventional circuitry. Bandpass amplifier 23 is formed from operational amplifiers 23A and 23B and associated resistors and capacitors. Two programmable resistors are included, appearing across points P1A, P1B and P2A, P2B, respectively. The two programmable resistors are provided by a DS1267S dual programmable potentiometer integrated circuit, 23C; the two potentiometers are independently adjustable, but in this circuit they are set to the same value by micro-controller 30. That value is a (programmed) function of the selected frequency tone to be detected. One of the programmable potentiometers, together with series resistor 23D and potentiometer 23E, provides the resistance across points P1A, P1B. The other programmable potentiometer, together with resistor 23F, provides the resistance across points P2A, P2B. The maximum value of each of the programmable resistances is 10K ohms in this embodiment.

The series resistor 23D, 23E on the one hand and 23F, on the other, "pad", the total resistance across points P1A, P1B and P2A, P2B so that the resistance range of the programmable resistors will span the desired range of frequencies to be detected. To achieve superior temperature stability and good tolerance between desired and achieved frequency response, capacitors C7 and C8 should be high quality capacitors; polypropylene capacitors are preferred.

Trim potentiometer 23E is used to compensate for component tolerances and to calibrate the center frequency of the passband filter. To adjust trim potentiometer 23E, the DIP switches 28 are first set to the center of the desired frequency-detection range (e.g., 440 Hz). A short circuit is then established between the points A and B. This causes the bandpass filter to oscillate; resistor R34 and diodes D4 control the amplitude of the oscillator. A frequency counter (not shown) is connected to monitor the frequency of oscillation at points A, B. Potentiometer 23E then is adjusted to cause the oscillator frequency to equal that set on the DIP switches. The short circuit between points A and B is then removed.

The transfer function T(s) of the bandpass amplifier 23, as is known in the literature of circuit design, is given by:

$$T(s) = \frac{2s/R5C}{s^2 + (s/R5C) + (1/RP1 \times RP2 \times C^2)}.$$

where

C=capacitance of each of C7 and C8

RP1=resistance across P1A, P1B and

RP2=resistance across P2A, P2B.

Preferably, RP1=RP2. In general, derivation of suitable component values for this filter is explained in literature such as A. B. Williams, *Filter Design Handbook*, hereby incorporated by reference.

Second differential amplifier 26 stage comprises an operational amplifier 26A and gain-setting resistors 26B, 26C One input of operational amplifier 26A receives the output from operational amplifier 21A and the other input of operational amplifier 26A receives, via resistor 26C, the output of the bandpass amplifier 23 from operational amplifier 23A. Since the resistors 26B, 26C are, in the illustrated embodiment, of equal resistance, the operational amplifier 26A has unity gain to both input signals; thus the output signal from stage 26 is a signal corresponding to the difference between the buffered input signal and the output of the bandpass filter — i.e., it is "notched"d at the center frequency of the bandpass filter.

As rectifiers 24 and 27 are identical and comparators 25 and 28 are identical, only one rectifier-comparator pair (24, 25) now will be discussed, it being understood this discussion applies to the other pair, as well. Rectifier 24 is a well-known absolute-value, or full-wave precision rectifier circuit, the design and operation of which are discussed in section 5.5. of A. B. Williams, *Filter Design Handbook*. To filter the rectifier output from pulsating DC to a more constant value, capacitor C101 is added. The output of rectifier 24, at point C, will be a DC voltage of approximately 62% of the peak AC voltage input to the rectifier.

Comparator 25 is simply an LM339 integrated circuit comparator, or equivalent, with a resistance R27, for example 1M ohm, connected between the output and non-inverting input to provide hysteresis. The voltage reference for the comparator is established by a voltage divider using precision resistors R14, R29 operating from a stable supply voltage. With a supply of 5 volts, R14=10K ohms and R29=1.47K ohms, a 650 mV reference is established at the inverting input of amplifier U3C. A 10k ohm resistor, R13, is used to pull up the output of the comparator. The micro-controller 30 may, for example, be a Phillips 87C750 microcontroller or other suitable device. A crystal, 30A, oscillates at, for example, 3.58 MHz and provides a clock signal for the micro-controller. The operation of the micro-controller is controlled by a program which has basically two functions. First, it causes the micro-controller to read the settings of switches 28 and sends to the digital potentiometer serial data to generate resistance values corresponding to the switch settings. Second, it checks the signal lines 25A and 28A from the comparators, to determine a valid tone detection. Optionally, when a valid tone is detected, the firmware also initiates a brief-duration lockout time during which the micro-controller ignores the comparator outputs, to avoid false re-triggering.

Figure 4:
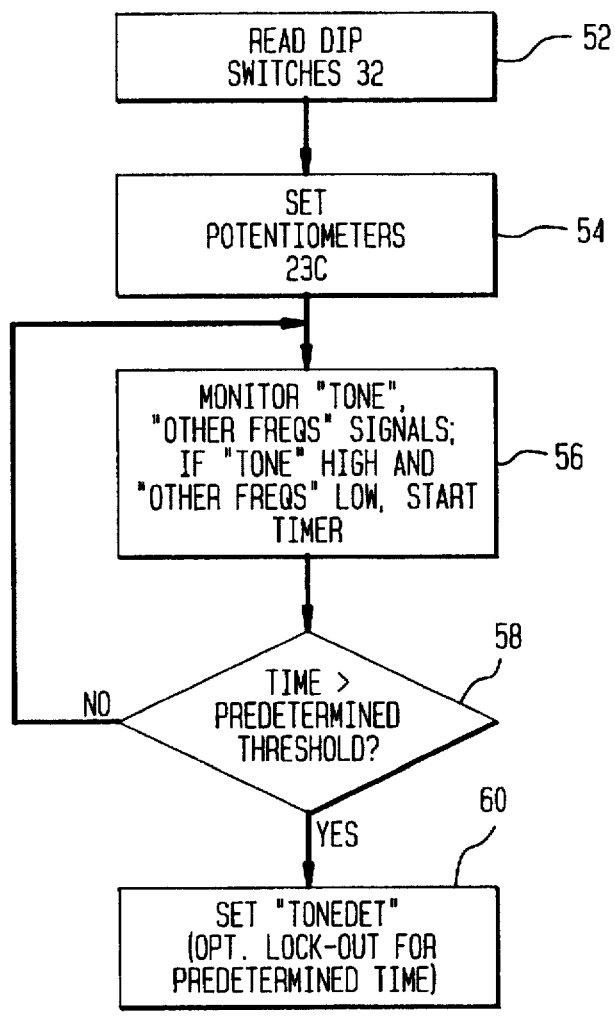
FIG. 4 is a flow chart for a program for operating the micro-controller of FIGS. 2 and 3.

A flow chart setting forth this operation is provided in FIG. 4. First, micro-controller 30 reads DIP switches 32, step 52. It then sets the resistances of potentiometers 23C, step 54. Next, the signals TONE and OTHERFREQ from comparator 25 and 28, respectively, are inspected (i.e., sampled), step 56. When the TONE signal is high and the OTHERFREQ signal is low, a timer is started. If this situation persists for more than a predetermined interval, such as one second (step 58), control proceeds to step 60; there an output signal, TONEDET, is asserted or pulsed to indicate the detection of the tone. Otherwise, control reverts to step 56, to continue monitoring the comparator outputs. Optionally, in step 60, when the TONEDET signal is generated, the micro-controller is caused to ignore the comparator outputs for another predetermined interval, such as five seconds. This is done to prevent false retriggering.

Having thus described the invention both in concept and in terms of an illustrative embodiment, together with some of its advantages and optional features, it will be apparent that such embodiment has been presented by way of example only and not by way of limitation. Those skilled in the art will readily devise alterations and improvements on this embodiment, as well as additional embodiments, without departing from the spirit and scope of the invention.

Figure 5:
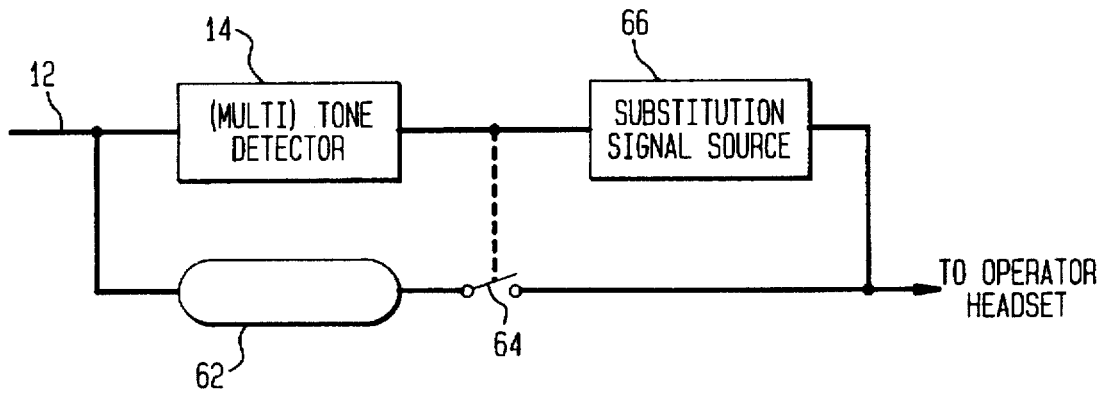
FIG. 5 is a block diagram of a system employing the invention to facilitate tone substitution.

To detect multiple tones simultaneously, as, for example, to detect a specific DTMF tone combination, multiple tone detectors may of course be used, one for each frequency. However, it is also possible to use a single micro-controller, with suitable multiplexing circuits, to control multiple bandpass-stopband filters. Another use of the invention is to facilitate substitution of another tone. That is, if the zip tone from the ACD is not pleasing to the operator, an arrangement such as that shown in FIG. 5 may be employed. There, the telephone line 12 from (e.g.) an ACD is supplied both to a tone detector 14 as described above, and to an (optional) audio delay circuit 62. The output of the audio delay circuit is connected to an output line which is connected to an operator's handset (not shown) via a switch 64. When tone detector 14 detects a zip tone, it opens switch 64, preventing the zip tone (delayed by circuit 62) from reaching the operator. Simultaneously it also starts a tone generator (or other audio source) 66, which supplies a tonal signal more pleasing to the operator. At the end of the zip tone, switch 64 is closed. Consequently a pleasing tone may be presented to the operator regardless of the zip tone frequency or the shape of the zip tone waveform.

Accordingly, the invention is limited only as defined in the following claims and equivalents thereto.

What is claimed is:

1. A tone detection system for detecting the presence of a tone on an audio channel containing one or more voice spectrum signals superimposed thereon, the tone having a predetermined frequency selectable from among a plurality of frequencies within the bandwidth of the audio channel, the tone detection system configured to be implemented in a voice messaging system having a message playback unit, the system comprising:

a bandpass filter having a center frequency selectable in response to a control signal, said bandpass filter receiving as input an input audio signal and generating a band-limited output signal indicative of the presence of a tone at approximately said center frequency of said bandpass filter;

a band-stop filter, having the same center frequency as said bandpass filter, and providing an output representing the difference between the input audio signal and said band-limited output signal;

a first detector circuit for generating, responsive to said band-limited output, a first output indicating when said band-limited output contains a tone having substantial energy at approximately said center frequency;

a second detector circuit for generating, responsive to the otuput of the band-stop filter, a second output indicating when said band-stop filter output signal indicates the presence of substantial energy at frequencies other than said center frequency and within the passband of the bandpass filter; and a controller configured to provide said control signal to set said center frequencies of said filters, said controller receiving said first and second output signals and generating a third output signal, for use by the message playback unit, indicating when a tone has been detected at said center frequency, said controller generating said third output when said first output signal indicates a presence of a tone for a predetermined time duration and said second output signal indicates a lack of presence of substantial energy at frequencies other than said center frequency for said predetermined time duration.

2. A voice messaging system comprising:

a message playback unit responsive to a playback control signal; and a tone detection system, coupled to said message playback unit, for detecting the presence of a tone on an audio channel containing one or more voice spectrum signals, the tone having a predetermined frequency selectable from among a plurality of frequencies within the bandwidth of the audio channel, including, a bandpass filter having a center frequency selectable in response to a control signal, said bandpass filter receiving as input an input audio signal and generating a band-limited output signal indicative of the presence of a tone at approximately said center frequency of said bandpass filter, a band-stop filter, having the same center frequency as said bandpass filter, and providing an output representing the difference between the input audio signal and said band-limited output signal, a first detector circuit for generating, responsive to said band-limited output, a first output indicating when said band-limited output contains a tone having substantial energy at approximately said center frequency, a second detector circuit for generating, responsive to the otuput of the band-stop filter, a second output indicating when said band-stop filter output signal indicates the presence of substantial energy at frequencies other than said center frequency and within the passband of the bandpass filter, and a controller configured to provide said control signal to set said center frequencies of said filters, said controller receiving said first and second output signals and generating said playback control signal indicating when a tone has been detected at said center frequency, said controller generating said playback control signal when, for a predetermined time period, said first detector circuit generates said first output and said second detector circuit generates said second output.

* * * * *